(12) United States Patent
Chou

(10) Patent No.: US 7,590,402 B2
(45) Date of Patent: Sep. 15, 2009

(54) POWER-SAVING CLIPPING APPARATUS FOR WIRELESS ELECTRONIC DEVICES

(75) Inventor: Chin-Wen Chou, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 471 days.

(21) Appl. No.: 11/304,898

(22) Filed: Dec. 16, 2005

(65) Prior Publication Data
US 2007/0142096 A1    Jun. 21, 2007

(51) Int. Cl.
*H04B 1/16* (2006.01)
(52) U.S. Cl. .................. 455/343.1; 455/574; 455/556.1; 455/557
(58) Field of Classification Search ................ 455/574, 455/343.1, 556.1, 557, 41.1–41.3
See application file for complete search history.

(56) References Cited

U.S. PATENT DOCUMENTS 7,305,224 B2 * 12/2007 Chen et al. ............... 455/343.1

FOREIGN PATENT DOCUMENTS

| GB | 2137560 A | * | 3/1984 |
| TW | 568197 | | 12/1992 |
| TW | M269369 U | | 7/2005 |
| TW | M270431 U | | 7/2005 |
| TW | R.O.C. M269369 | * | 7/2005 |
| TW | M278000 U | | 10/2005 |

* cited by examiner

*Primary Examiner*—Edward Urban
*Assistant Examiner*—Junpeng Chen
(74) *Attorney, Agent, or Firm*—Muncy, Geissler, Olds & Lowe, PLLC

(57) ABSTRACT

A power-saving clipping apparatus for wireless electronic devices aims to hold and anchor a receiver in a wireless electronic device. The clipping apparatus has a power-saving switch which is electrically connected to the wireless electronic device. The power-saving switch is actuated by the clipping apparatus to make the wireless electronic device to enter an OFF or sleeping mode when the receiver is in the holding and anchoring condition. Thus when the wireless electronic device is not in use it can hold and anchor the receiver and save electric power at the same time.

4 Claims, 6 Drawing Sheets

US 7,590,402 B2

POWER-SAVING CLIPPING APPARATUS FOR WIRELESS ELECTRONIC DEVICES

FIELD OF THE INVENTION

The present invention relates to a power-saving clipping apparatus for wireless electronic devices and particularly to a clipping apparatus to hold and anchor an external receiver of a wireless electronic device and simultaneously set the wireless electronic device to an OFF or sleeping mode in the holding and anchoring condition to save power.

BACKGROUND OF THE INVENTION

The general wireless electronic device adopts infrared or Bluetooth wireless communication mode to transmit signals to an external receiver linking to a computer host end to transfer instruction signals to the computer. To prevent the receiver from inadvertently losing due to small size, the present wireless electronic device usually has a coupling means to hold the receiver when not in use. For instance, R.O.C. patent publication No. 568197 and Patent No. M269369 disclose a clipping apparatus which provides a clipping space to securely hold a receiver in a wireless electronic device.

However, use of the wireless electronic device not only has to take into account of preventing losing of the receiver, operation power of the wireless electronic device is another issue to be considered. As most wireless electronic devices do not enter a sleeping or OFF mode in the non-use condition, the wireless electronic devices continuously consume electric power. As a result, when users try to use the wireless electronic devices next time, the electric power could be exhausted. Then the battery has to be replaced or charged. To remedy this problem, a positioning structure has been developed to hold the receiver and simultaneously force the wireless electronic device to the sleeping or OFF mode. Reference can be found in R.O.C. Patent No. M270431. It has the receiver positioned outside the wireless electronic device. But when the wireless electronic device is moved by users, the receiver still might be hit and lost. Its anchoring effect is not as desirable as Nos. 568197 and M269369 mentioned above. R.O.C. Patent No. M278000 discloses another technique, which holds the receiver inside the wireless electronic device. And the wireless electronic device has a power-saving switch inside. When the receiver is held inside, the power saving switch is depressed to set the wireless electronic device to the sleeping or OFF mode. However it adopts a design which receives the receiver in a parallel manner. As the distal ends of the receiver and elastic reeds are made of metal, a slight skewing of the receiver could result in a faulty insertion angle and cause incomplete or erroneous compression of the power saving switch, and the elastic reeds could be deformed or even fractured. Moreover, the power-saving switch is quite bulky and a greater space has to be allocated in the wireless electronic device for housing and depression. It is against the prevailing design trend of the wireless electronic device that demands slim and light.

SUMMARY OF THE INVENTION

The primary object of the present invention is to solve the aforesaid disadvantages. The invention provides a clipping apparatus which serves as an anchoring structure of a receiver. The clipping apparatus has a power-saving switch which is electrically connected to a wireless electronic device. The power-saving switch is actuated by the clipping apparatus so that when the receiver is held and anchored, the wireless electronic device enters a OFF or sleeping mode. Thereby when the wireless electronic device is not in use it can hold the receiver and also save electric power at the same time.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1A:
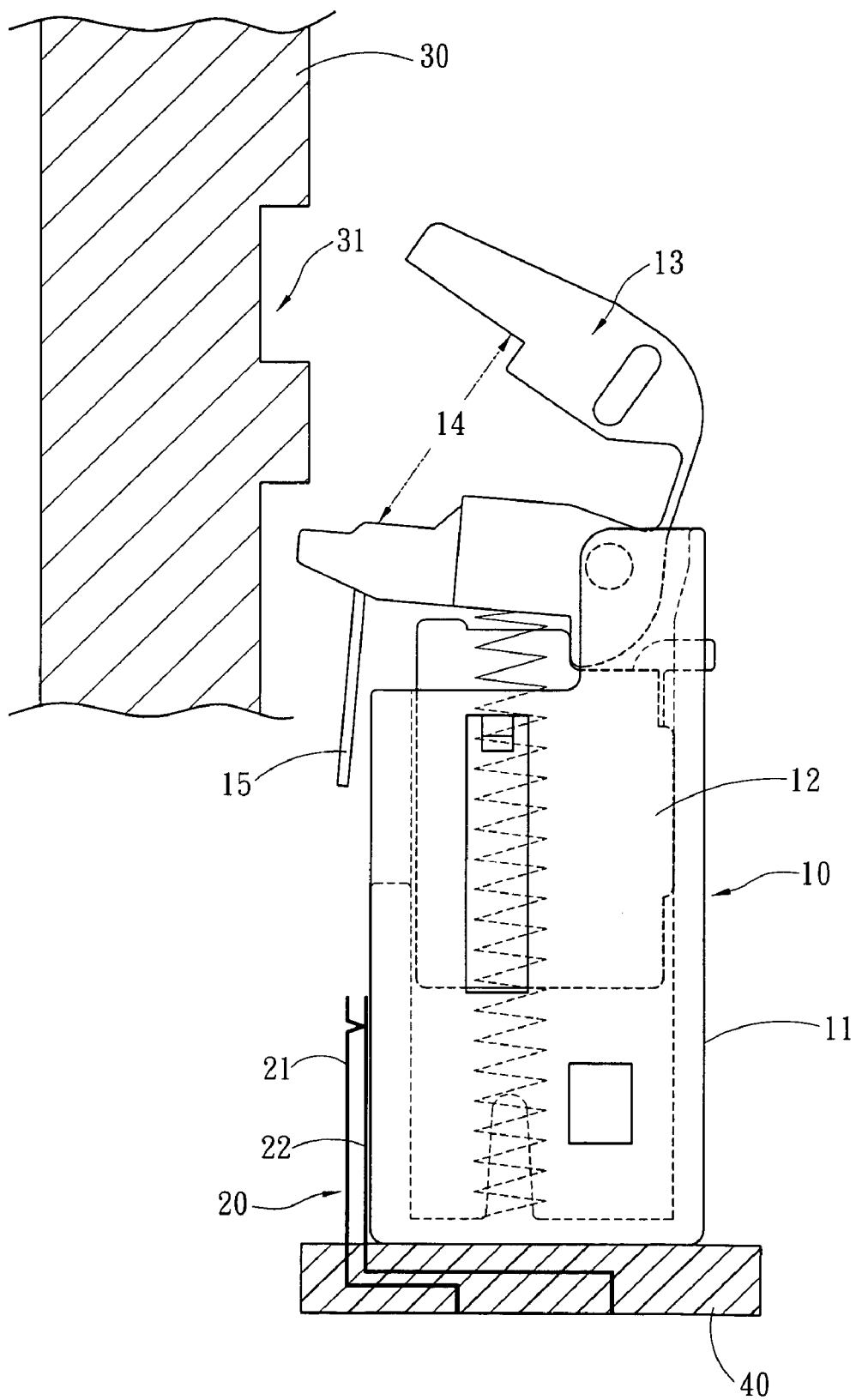
FIGS. 1A and 1B are schematic views of a first embodiment of the present invention.
Figure 1B:
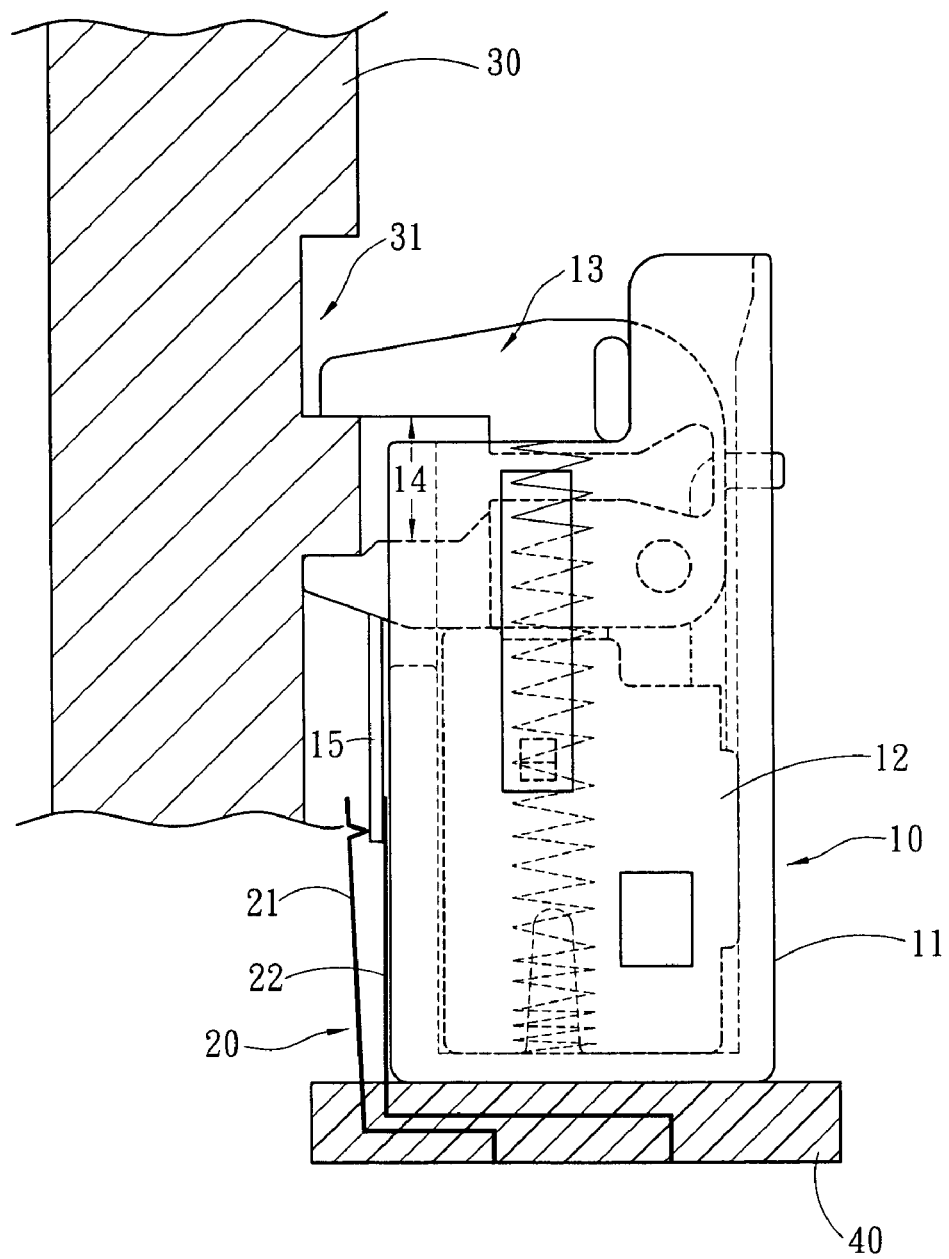

Please refer to FIGS. 1A and 1B for a first embodiment of a power-saving clipping apparatus 10 for a wireless electronic device (not shown in the drawings) of the invention. It aims to hold and anchor a receiver 30 in the wireless electronic device. The clipping apparatus 10 includes a body 11 and a moving dock 12. The moving dock 12 is movable relative to the body 11 at an original position and an anchor position. The moving dock 12 has a clipping mechanism 13. When the clipping mechanism 13 is at the anchor position it forms a clipping space 14 to confine the receiver 30 from escaping the wireless electronic device. The clipping mechanism 13 may also adopt the ones depicted in Nos. 578197 and M269369 previously discussed that have a fan type moving track to form the clipping space 14. In this embodiment, the clipping mechanism 13 first generates a vertical moving track, then forms a fan type moving track (as shown in FIG. 1B) to form the clipping space 14.

Figure 2A:
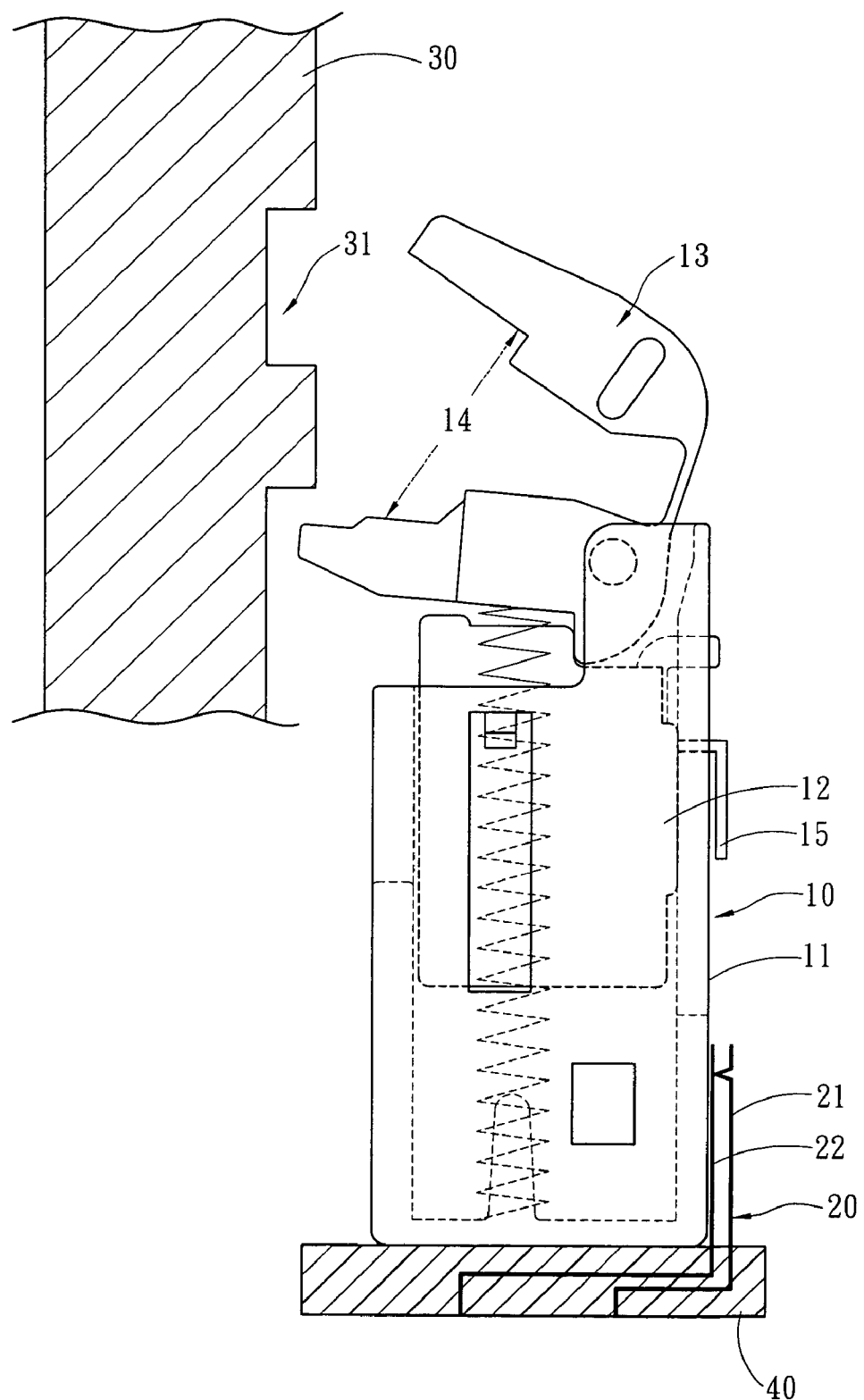
FIGS. 2A and 2B are schematic views of a second embodiment of the present invention.
Figure 2B:
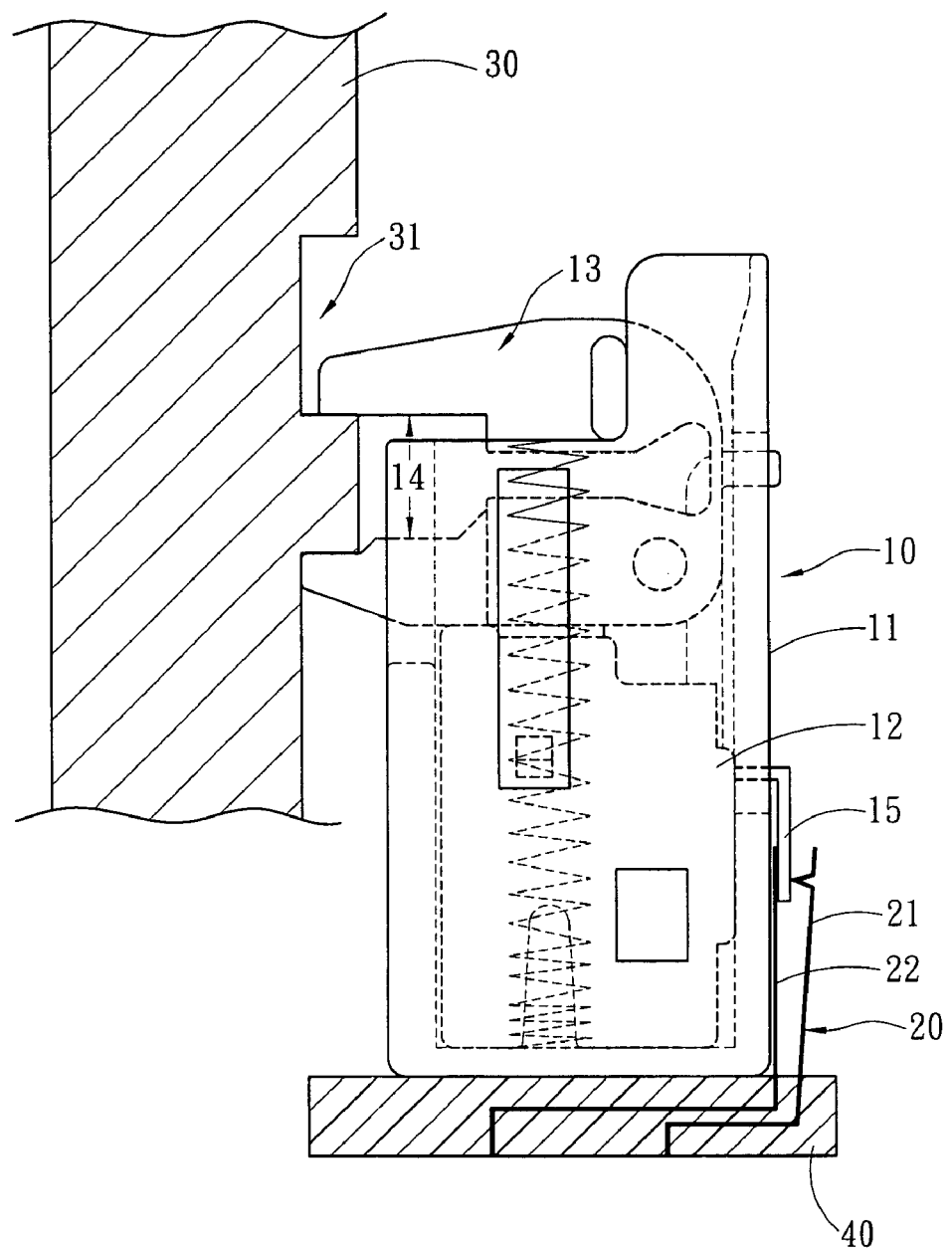
Figure 3A:
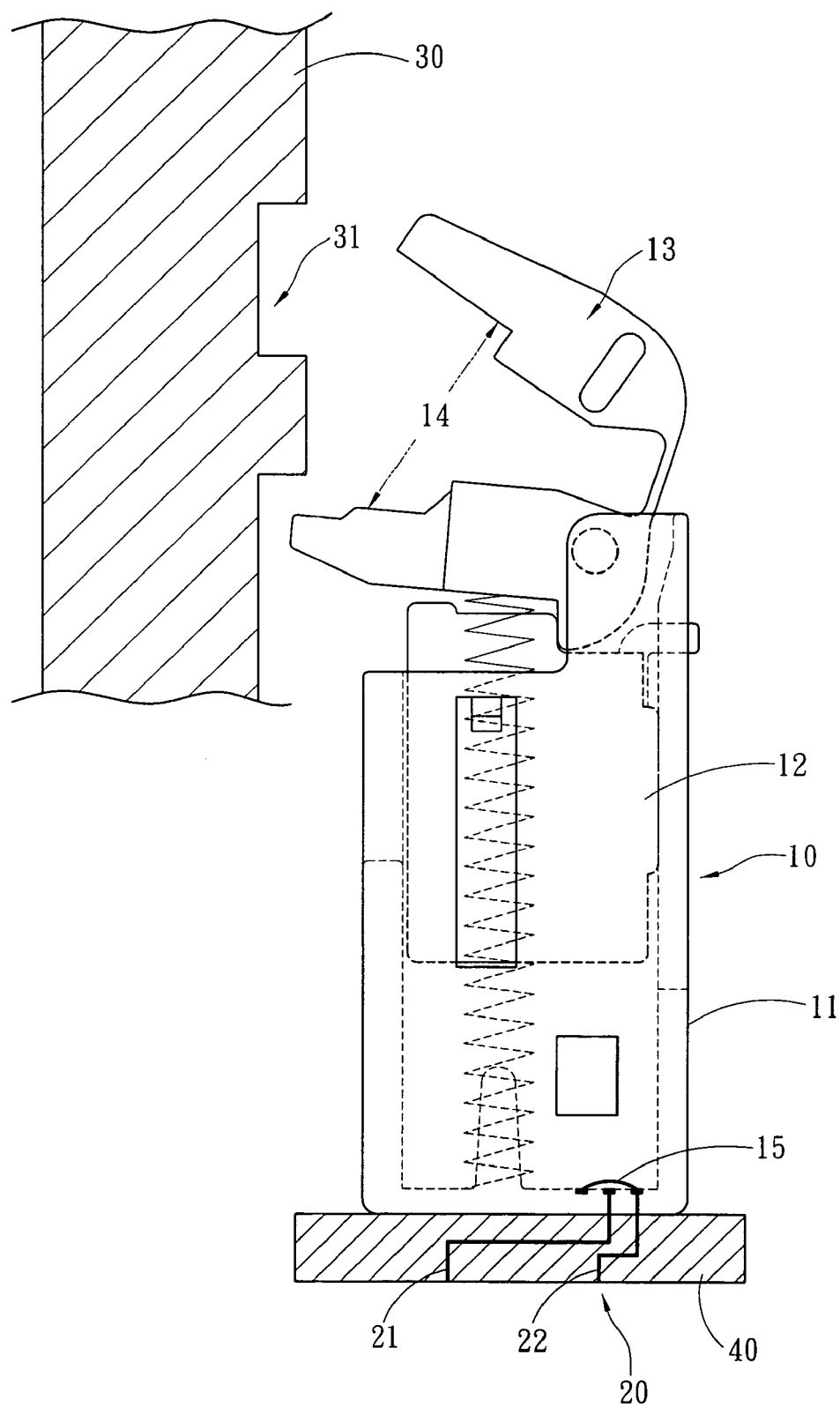
FIGS. 3A and 3B are schematic views of a third embodiment of the present invention.
Figure 3B:
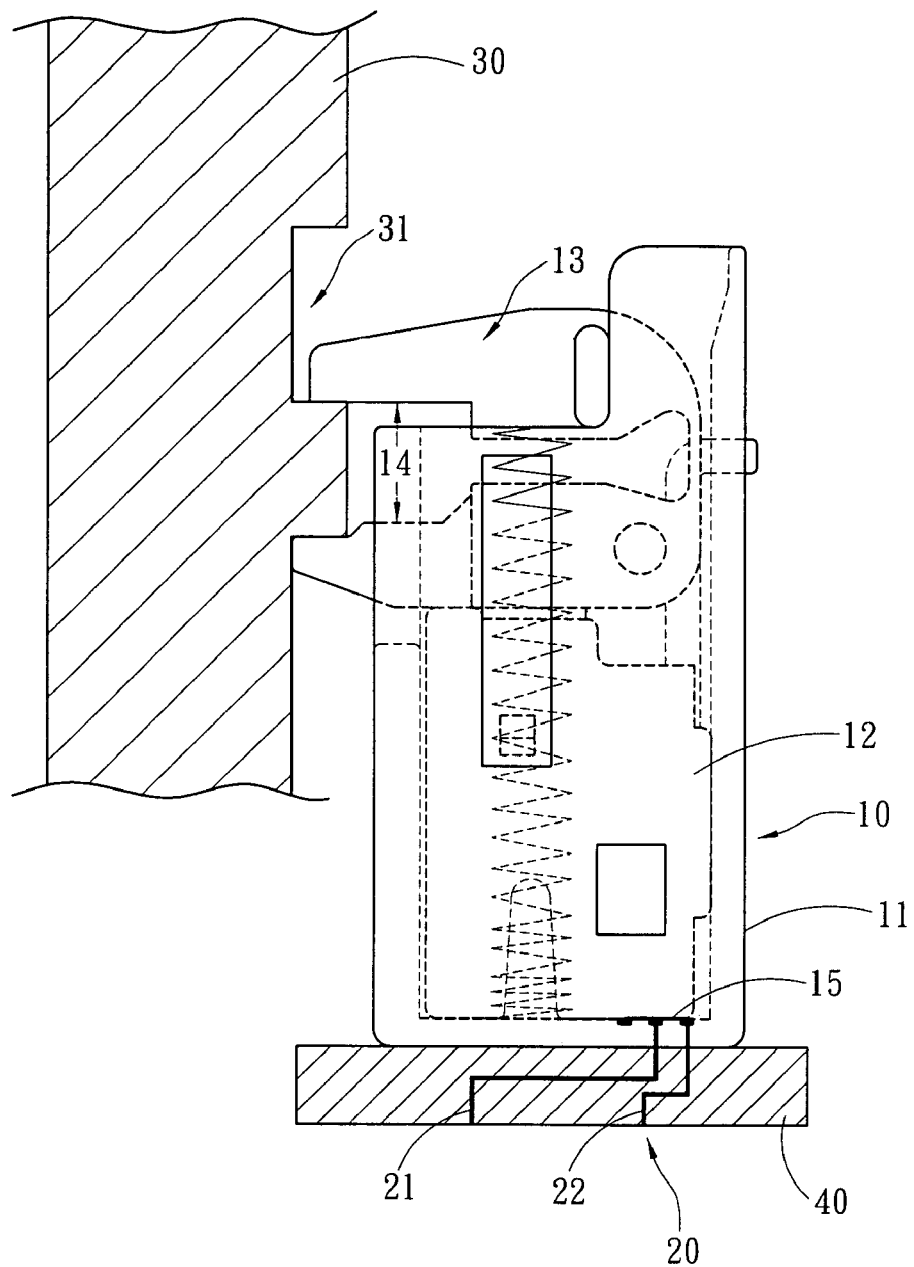

The invention mainly includes a power-saving switch 20 within the moving range of the clipping apparatus 10. The power-saving switch 20 is electrically connected to the wireless electronic device. Or more specifically, the power-saving switch 20 is electrically connected to a power management circuit board 40 of the wireless electronic device. In FIGS. 1A and 1B, the moving dock 12 has an actuation portion 15 on one side extending towards the power-saving switch 20 (in FIG. 1A, it is located on the same side of the clipping space 14; in FIG. 2A, it is located on another side opposing the clipping space 14). The power-saving switch 20 is located on the body 11 at the same side. The actuation portion 15 determines the power-saving switch 20 in an ON or OFF condition at the original position and (及) the anchor position. In the embodiment shown in FIGS. 3A and 3B, the power-saving switch 20 is located in the body 1 and set to the ON or OFF condition by the moving dock 12 at the original position and the anchor position. Referring to FIGS. 1B, 2B and 3B, when the receiver 30 is to be positioned into wireless electronic device and rams against the clipping mechanism 13, the actuation portion 15 also is moved towards the anchor position. When the moving dock 12 reaches the anchor position, the clipping mechanism 13 forms the clipping space 14 to harness a clipping notch 31 of the receiver 30 to form a secured anchoring. Meanwhile, two electrode terminals 21 and 22 of the power-saving switch 20 to form the ON or OFF condition are driven by the moving dock 12 or the actuation portion 15 to alter the original electric connecting condition.

Therefore, an electric signal is generated to make the wireless electronic device to enter the OFF or sleeping mode. When the aforesaid operation is done in a reverse order to remove the receiver 30, the moving dock 12 or actuation portion 15 is separated from the power-saving switch 20, and the two electrode terminals 21 and 22 returns to the original electric connecting condition. Thus when the moving dock 12 returns to the original position, the power-saving switch 20 generates another electric signal to make the wireless electronic device to enter a starting mode. Hence by means of the invention, the clipping apparatus 10 can firmly hold the receiver 30 and make the wireless electronic device to enter a power-saving mode at the same time.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power-saving clipping apparatus for wireless electronic devices to hold and anchor a receiver in a wireless electronic device, comprising:
   a body;
   a moving dock which is movable relative to the body between an original position and an anchor position, the moving dock having a clipping mechanism to form a clipping space in the anchor position to confine the receiver from escaping the wireless electronic device; and
   a power-saving switch which is electrically connected to the wireless electronic device and actuated by the moving dock at the anchor position to make the wireless electronic device to enter an OFF mode or a sleeping mode, the power-saving switch actuating the wireless electronic device to enter a starting mode when the moving dock is at the original position;
   wherein the moving dock has an actuation portion on one side extending outside the body and towards the power-saving switch, the power-saving switch being located outside the body on one side thereof same as the actuation portion, the actuation portion at the original position and the anchor position determining an ON or OFF condition of the power-saving switch.

2. The power-saving clipping apparatus of claim 1, wherein the power-saving switch has at least two electrode terminals to form an ON or OFF condition.

3. The power-saving clipping apparatus of claim 1, wherein power-saving switch is electrically connected to a power management circuit board of the wireless electronic device.

4. The power-saving clipping apparatus of claim 1, wherein the dock contacts an inside bottom of the body in the anchor position.

\* \* \* \* \*